United States Patent [19]

Tannenbaum

[11] Patent Number: 5,521,363
[45] Date of Patent: May 28, 1996

[54] SYSTEM AND METHOD FOR TRACKING MEMORY CARD TRANSACTIONS

[76] Inventor: David H. Tannenbaum, 6219 Raintree Ct., Dallas, Tex. 75240

[21] Appl. No.: 197,234

[22] Filed: Feb. 16, 1994

[51] Int. Cl.⁶ .................................................. G06F 17/60
[52] U.S. Cl. ............................ 235/379; 235/375; 235/380
[58] Field of Search .................................... 235/375, 379, 235/380

[56] References Cited

U.S. PATENT DOCUMENTS

| | | | |
|---|---|---|---|
| 4,454,414 | 6/1984 | Benton | 235/379 |
| 4,544,834 | 10/1985 | Newport | 235/487 |
| 4,689,478 | 8/1987 | Hale | 235/380 |
| 4,797,542 | 1/1989 | Hara | 235/380 |
| 5,177,342 | 1/1993 | Adams | 235/372 |
| 5,221,838 | 6/1993 | Gutman | 235/379 |

Primary Examiner—Donald T. Hajec
Assistant Examiner—Karl D. Frech
Attorney, Agent, or Firm—Fulbright & Jaworski

[57] ABSTRACT

There is disclosed a system and method of allowing a memory card user to keep track of all pertaining to the account identified by the memory card electronically in a manner separate from the central credit processing center. Under one embodiment of the system each time a credit transaction occurs itemized credit transactions are temporarily stored on the users credit card for subsequent transfer by the user to a user controlled processing system, such as a PC, for electronic entry into the users processing system. The user then may reconcile information from time to time stored on the card with information obtained from the central processing center. The system also allows for the information that is stored on the card to be used to provide information and control capabilities to the user (for example, to control a telephone network) under selective control of the user.

12 Claims, 4 Drawing Sheets

SYSTEM AND METHOD FOR TRACKING MEMORY CARD TRANSACTIONS

TECHNICAL FIELD OF THE INVENTION

This invention relates to a system and method for automatically tracking memory card transactions and more specifically to such a system and method which allows a memory card user to track account usage by providing for the storage of account transaction data on the money card on a transaction by transaction basis.

BACKGROUND OF THE INVENTION

While some people seem to thrive on keeping detailed records and itemizing all of their credit card purchases into a written log, most of us do not! Almost no one enjoys the tedium of entering each credit card transaction into a log for comparison against statements received from the credit card company. However, most of us desire to have such a log and the reality of life is that as the number of credit card transactions continues to increase the problem becomes compounded.

Today many computer programs exist, such as, for example, QUICKEN by Intuit, which manage checkbooks and credit card accounts electronically and which keep track of a users finances. Average users today have an enormous amount of computing power in their homes which allows them to keep extremely detailed records of their financial transactions. However, there remains one hitch in the process. And that is the fact that a credit card user must enter data from each transaction manually into the proper account so that when the credit card statement arrives from the credit card issuer, the detailed listings on the statement can be compared for accuracy against the listings manually entered by the user into the financial records. Thus, a prudent credit card user who enters into a transaction with a merchant takes the credit slips home and enters the information manually into the computer. Most of us perform this function sporadically at best.

To help with this problem, some credit card companies are now providing their customers with electronic versions of their monthly statements which can be entered into the users accounting programs easily, either by modem or floppy disk or by some other memory transfer arrangement. This solves the problem of tracking purchases on an item by item basis without requiring the manual entry of data by the user. It does not, however, solve the problem of checking the credit card company for errors and certainly does not solve the problem of knowing, on a day by day basis, the status of credit balances. In situations where the credit transaction is made by debit card, as opposed to credit card, day by day, even hour by hour, knowledge of the balance available in an account is essential.

Thus, there is a need in the art for an electronic method of providing a credit card user with accurate transaction data independent from the central data processing center of the credit card issuer.

Another need in the art exists for a system which allows for a determination of credit card availability at any time without inquiry to the credit card issuer.

A still further need exists in the art for a system and method which allows for communication of data from a credit card issuer directly to a credit card user on a transaction by transaction basis.

SUMMARY OF THE INVENTION

These and other problems and needs have been solved by a system and method which allows for each transaction to be recorded directly on the credit, or debit, card in a temporary manner. In operation, the user makes a credit card purchase and the merchant itemizes the transaction. The credit card is placed in an access unit and the account number is transmitted to the card issuer's central processing facility, usually located remote from the merchant. The merchant transmits the summarized transaction data to the central processing facility operated by the credit card company for entry against the user's account. In a debit situation, the amount is deducted from an account balance. In a credit situation the amount is added to the other unpaid charges and compared to the credit limit. In either situation, a record (printed local to the transaction) detailing the transaction is handed to the user.

In the new system, in addition (or as a substitution) the detailed transaction data is stored on the card itself. This allows the user to take the card to his/her own processing device, such as a PC, and place the card in a reader to transfer the stored transaction data into the users own accounting program running on the PC. Thus, the user can have immediate access to itemized data pertaining to the account and can obtain an immediate and accurate balance.

In one embodiment, the PC can be a hand held device which is carried with the user so that the user will have instant ability to analyze the account. The processing capability can even be on the card itself so that the user, by providing certain inputs, can have a microprocessor internal to the card yield whatever account analysis is desired. This system, for example, will allow a user who is traveling to keep track of hotel bills, currency exchange, food charges, etc. directly since all of the supporting data will have been entered as the transactions occur.

By incorporating selective inputs on the card, such as buttons, fingerprint inputs, audio selective inputs and visual outputs, a user can have instantaneous access to account information. The credit card issuer could along with each transaction send information, such as low balance warnings, which then would be read from the card memory into a display under control of the user. If an on-card processor is used then that processor could generate warning signals reflective of balance information without waiting for such information to come from the central processing center.

In an alternate use, the card issuing company could place "other" information on the card pertaining to the account which, in the strict sense, is not credit information but which could be used, for example, to control processing at the processing center. An example of this type of operation would be telephone numbers of calling parties who desire to be called back. These numbers could be placed on the card whenever the card is being used to initiate a transaction. A signal could light or a noise sound to signify that a telephone number is available to be called. The telephone number could be read from the card if a visual display is available or the telephone number could be used directly in a telephone to control the public switching system. This arrangement could result in a combination of credit card transaction data and telephone number storage both occurring during a credit transaction and would be particularly useful for communicating with people who are traveling.

The system of the present invention will allow credit information to be stored on a credit card even when no communication links exist to the central processing facility. During a transaction, the credit limit information could be obtained directly from the card and new information entered all by the local merchant. Under this system, when the card is next used in cooperation with a central processing center, the center will interrogate the card for all transactions not previously recorded and then the central facility would record the previously unrecorded transactions. The center will then update the credit limits on the card and perhaps issue a warning when the limits on the card are mismatched from those at the center.

Another use for the system would be in a business environment where employees are issued credit cards for travel and entertainment purposes. The employees periodically, such as upon entering the office in the morning, would "swipe" the card through a reader. All of the stored credit transactions would be read from the card and entered directly in the company's accounting computer. This would provide an immediate daily record of expenditures allowing for increased management control as well as a reduction in worker preparation and computer data entry time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Before beginning a discussion of the system and methods employed by this invention, it might be time well spent in setting a level playing field for the terms used in this application. The term credit card herein indicates not only the cards used for charging items of sale or lease to an account to be paid later by the user but also to debit cards, phone cards and other memory devices which are used interactively to identify the holder of the device and to control some transaction particular to such user.

The card would be typically issued by a company which owns the card. Such a company would be, for example, Third Street VISA. This company will be called the issuer in this application and the issuer, in turn, allows a named user to carry the card and to purchase or lease articles of commerce using the card, either by immediate payment as with a debit card or from delayed payment as with a credit card.

Sometimes the card merely allows access to a secured area, or to a checking/saving account in the ATM banking network. The user may have several such cards from the same or different issuers and several family members may have access to the card or to separate cards associated with the same account. Typically, a central clearing house gathers all of the point of sale data from a group of merchants where information is coming from different cards belonging to different issuers. This clearing house acts to approve credit limits and to accept new purchases and then forwards the stored data to the proper individual issuing company. In the discussion herein the entire network of data gathering, interfacing with the customer and the merchant and providing itemized billing is called the data processing center for ease of discussion herein.

Figure 1:
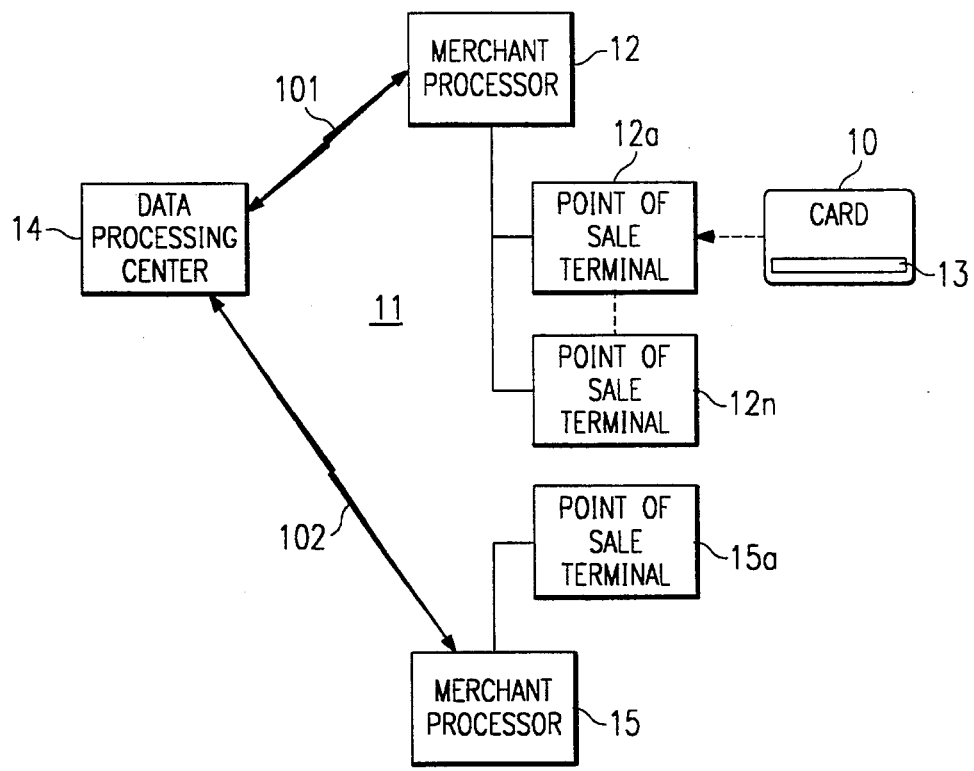
FIG. 1 shows a system view of a point of sale set of terminals interfacing between a credit card and a data processing center.

Turning now to FIG. 1, system 11 is shown with data processing center 14 connected to several merchant processors 12 and 15 over communication links 101 and 102 which in turn service point of sale access units 12a, 12n and 15a respectively. The communication links could be regular telephone lines, cellular, microwave or any type of data transmission medium. Access terminals 12a, 12n and 15a could be the type where credit cards are inserted or could be the type that are accessed by a magnetic or other electrical or wave transmission device even without physical contact, a requirement being that bidirectional information transfer must occur between the terminal and the card, such that information previously stored on the card may be read, while information contained either at processor 12 or 15 or at processing center 14 can be transferred to, and stored on, the card. Card 10 is representative of the numerous credit card, debit card, phone card or controlled access cards that can be used. Contained on card 10 is magnetic strip 13 which is used to hold the account data pertaining to the card. Of course, any type or combination of storage media could be used, including semiconductor memory arrays and memories embedded in the material of the card.

In operation, the user would make a purchase at a place of business. Typically, this purchase would include several different items. The card user would then take the items to a cashier at a point of sale access unit, such as unit 12a. The cashier would itemize the transactions to derive a total. This total is contained within merchant processor 12 and can either be manually entered or entered therein electronically by way of bar code sensors. If the user desires to pay for the purchases by credit (or debit) card then the card is given to the cashier (or "swiped" through an electronic reader) and the account number is transmitted to central processing center 14 via communication link 101. Center 14 then accesses its data base and determines whether or not enough credit exists in the account to allow the new purchases to be added to the amount previously charged but unpaid for.

Figure 3:
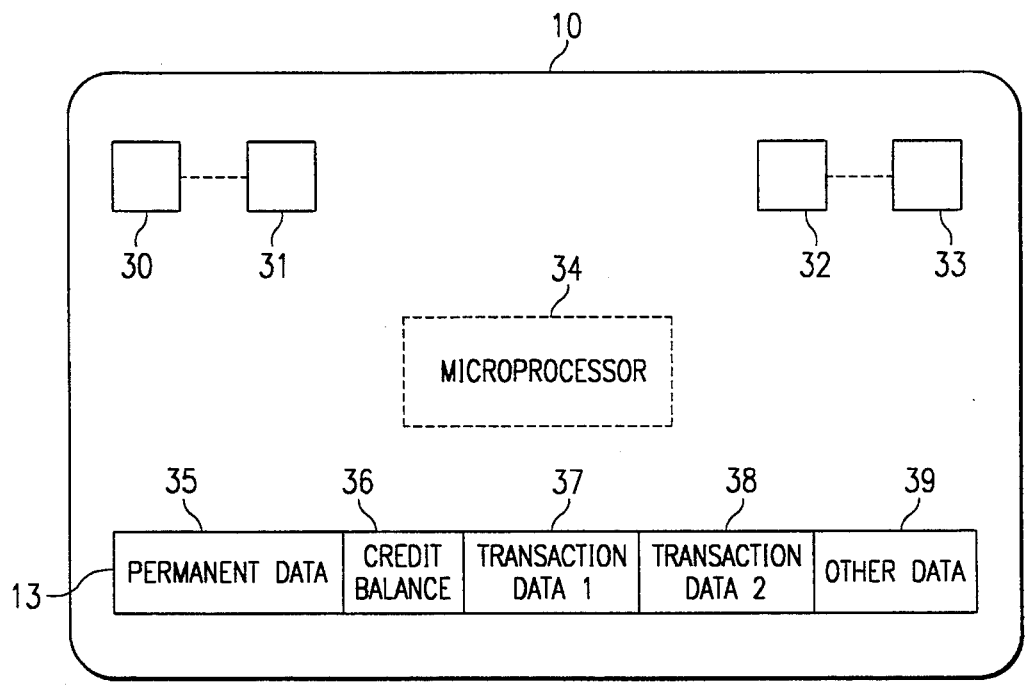
FIGS. 3 & 4 show the front and back sides, respectively, of a typical credit card using this invention.

In the inventive system, either processor 12 or the processor (not shown) at center 14, would then enter the itemized transaction data onto a storage medium on card 10 via access unit 12a. This would be accomplished while the credit card was still in access unit 12a or by having the user "swipe" the card through a slot reader. Ideally, for checking purposes it would be best if the data to be stored on card 10 is received directly from processor 12. If card 10 where to have two storage fields (as shown in FIG. 3) processor 12 could store the same data in both and then center 14 could at any time remove the data still allowing the user to have access to the data in the other storage area. This would allow for the situation where center 14 is unavailable and the transaction could still occur since center 14 would read the stored data during a subsequent transaction. A stable storage area facilitates this type of operation but is not necessary.

Figure 2:
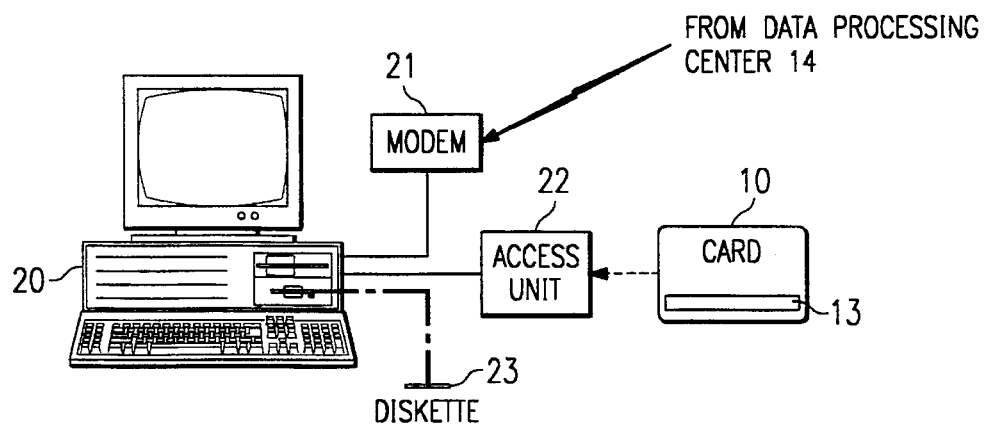
FIG. 2 shows a typical home arrangement where a user enters data directly from a credit card into an accounting application running on a PC.

Turning now to FIG. 2, there is shown a user's home accounting system controlled by PC 20. The user could have, for example, within PC 20 the QUICKEN accounting application by Intuit which is well-known and commercially available. The accounting application would receive data from the user pertaining to charges to his/her credit account. This information could be hand entered by the user working from the receipts obtained at each transaction, as is done now. The information could be obtained by diskette 23 directly from the card issuer as part of the monthly statement or the information could come electronically via modem 21 from data processing center 14 as is also done today.

In the operation of the inventive system, however, the information pertaining to the account transactions would come from the card itself when the user places card 10 into access unit 22. This operation would serve to remove (or transfer) the data stored on storage medium 13 of card 10 and to place that data in the accounting program operating within PC. The information from card 10 then could be matched against information obtained electronically from the card issuer and a complete report generated as to the accuracy of the account, including account balances.

FIG. 3 shows the front side of card 10 with microprocessor 34 optionally built into the structure of the card. Microprocessor 34 is entirely optional and used only when it is desired to manipulate the data stored on the card. Card 10 could, if desired, have input buttons 30, 31 which could be responsive, perhaps on a selective basis, to the user's input for generating reports from the data contained on the card. One type of selective input could be a fingerprint or a heat sensor sensitive to the designated user of the card. Outputs 32, 33 could be LEDs or liquid crystals or flat panel displays for visual output or they could be piezoelectric or other sound producing devices to yield an audio output controlled by data stored on the card from time to time.

Storage medium 13 could include section 35 which contains the traditional account data. Section 36 could contain the account credit balance. This account balance data would either be transmitted to the card as part of the data transfer from center 14 or could, if microprocessor 34 were to be used, be generated internally by the card. Section 37 could be transaction data storage area 1 where the data is to be stored pertaining to each transaction. Data storage area 2 is shown as section 38 and is optional for use and can, for example, be used when center 14 desires to interrogate the card for transactions that might have been recorded on the card but not recorded centrally, as discussed above. Section 39 could contain miscellaneous other data, such as a low credit warning, a message to the user or, perhaps, the telephone number of calls waiting for a return call. These telephone numbers could be displayed, or they could cause an audio or visual signal, or they simply could be used to activate a call when swiped through a telephone.

Figure 4:
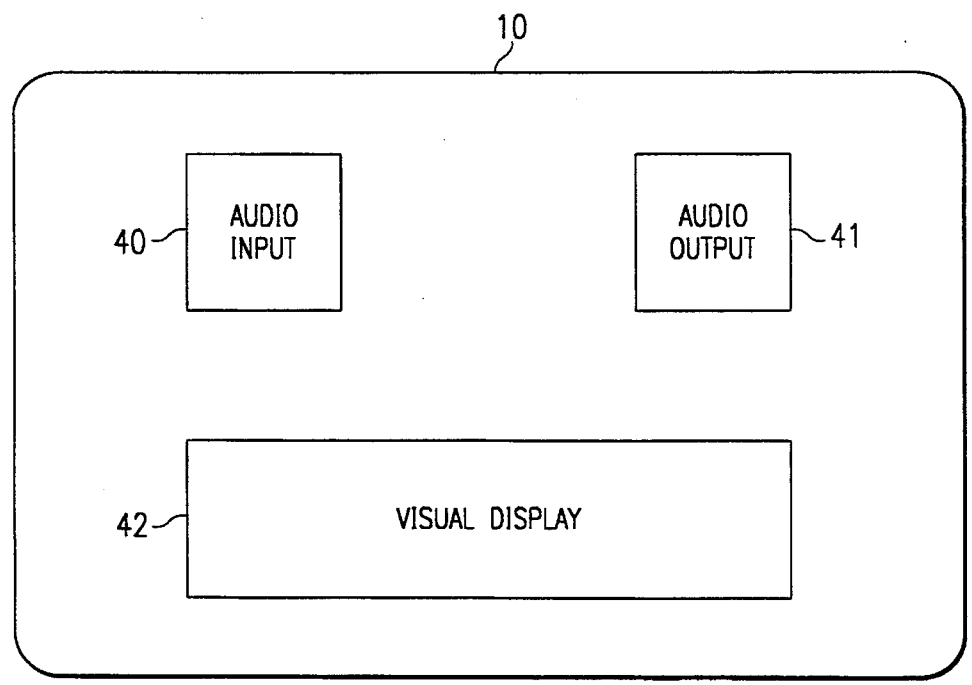

FIG. 4 shows the back of the card having audio input 40; audio output 41 and visual display 42. For the basic system these are optional but would be used for systems where the data temporarily stored on the card is desired to be manipulated locally on the card.

Figure 5:
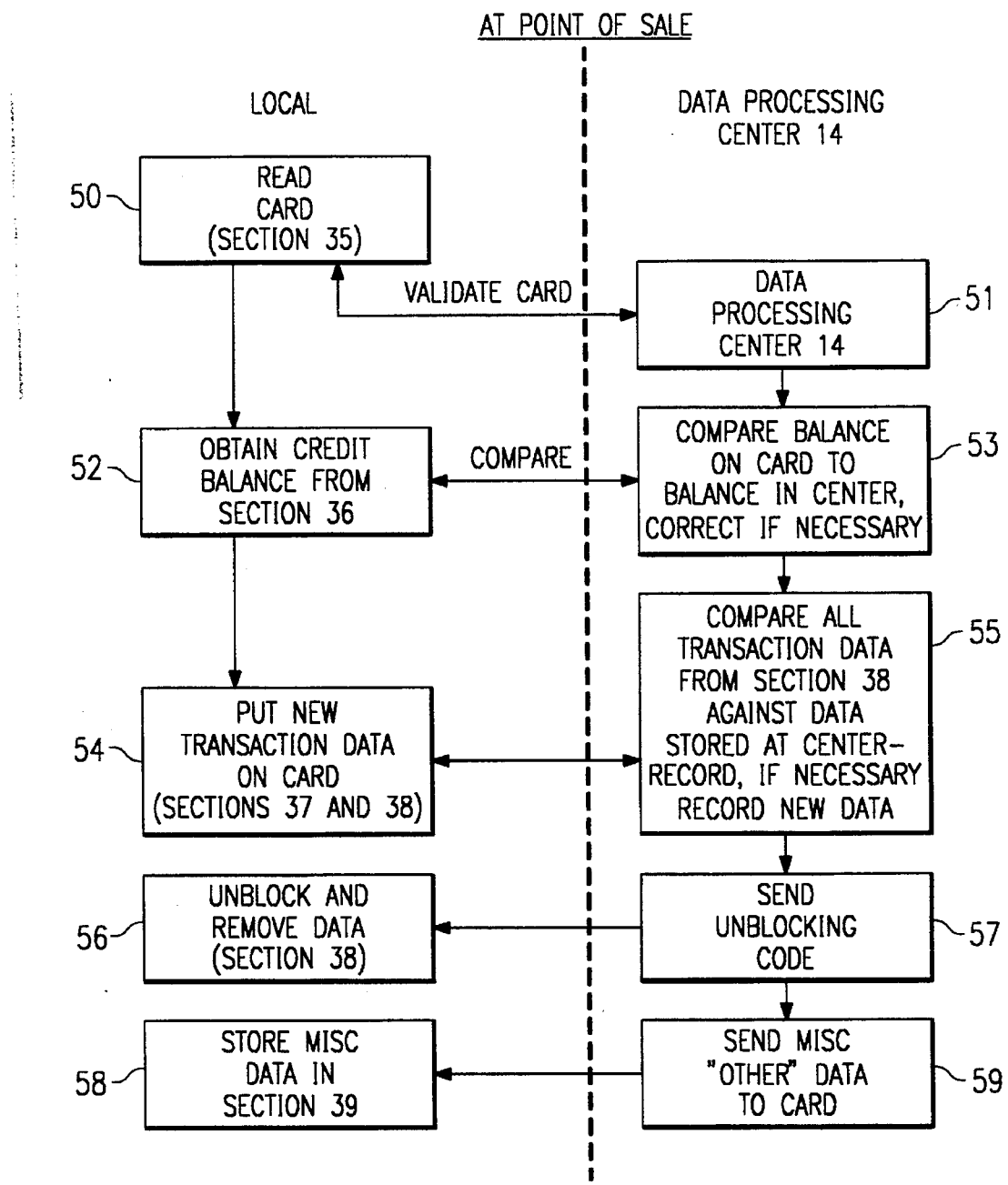
FIG. 5 shows a flow chart of system operation.

FIG. 5 shows a flow chart at the point of sale. Box 50 reads the card and passes information to center 14 via box 51. It should be noted, as discussed above, that this system will work even if center 14 is not attached. Box 52 obtains credit balance information, either from box 53 or from information stored on the card. Box 54 places new transaction data on the card and sends information to box 55 for use at center 14. Boxes 56 and 57 cooperate such that the duplicate information stored in section 38 (FIG. 3) of card 10 is unblocked and transferred to center 14. If a second storage area, such as block 38, is not used, then the transaction data in block 37 can be read and compared against information already stored at center 14 and the center 14 stored data can be updated, if required. Boxes 59 and 58 control the storage of "other" data, such as telephone numbers, on the card.

Figure 6:
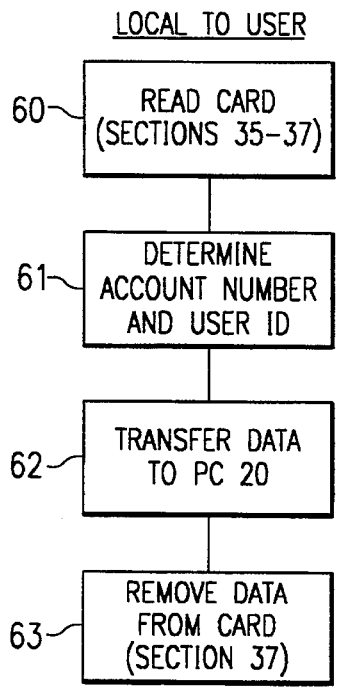
FIG. 6 shows a flow chart of a typical user PC accounting operation.

FIG. 6 is a flow chart of the operations that occur local to a user where the user, via box 60 reads sections 35, 36 and 37 of card 10 to obtain the account number via box 61 for proper credit to the accounting program and, if available, the exact family member user. Section 36 yields the account balance and section 37, the actual itemized transaction data. The user, under direction of the application program, can remove that data at this time for storage in the main accounting application, if desired. Boxes 62 and 63 control these functions. By using the second card storage area 38, the user is free to remove the transaction data from the card at any time. If a separate area is not used, then the user can only copy the data to the local PC until such time as center 14 is updated.

Figure 7:
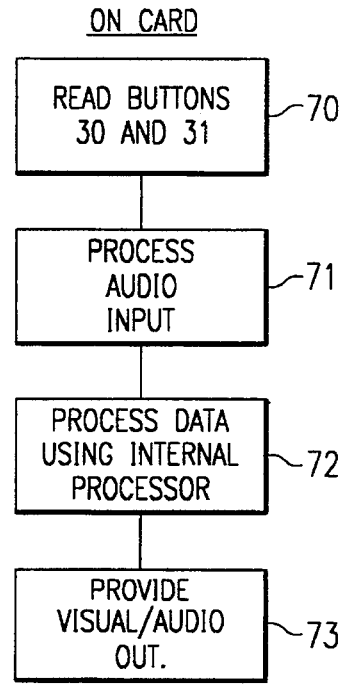
FIGS. 7 & 8 show typical on-card operations.

FIG. 7 is a flow chart of on-card operations and is dependent upon the presence of a microprocessor. Any microprocessor will work; for example, the INTEL 8086 would have more than enough capacity and a much less powerful more specific microprocessor could be employed. The on-card system would read buttons 30, 31 or audio 40 input via boxes 70 and 71. This data would be processed by box 72 and outputs provided via box 73. Box 72 would be used from time to time to calculate the amount of credit available. This calculation could also occur by a transfer to PC 20 via box 62.

Figure 8:
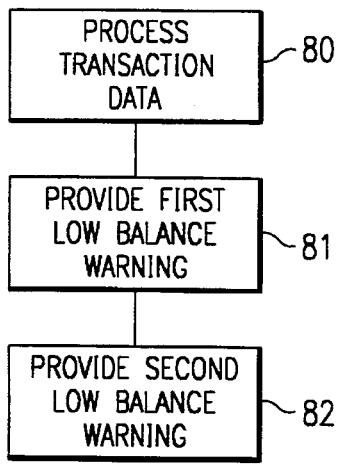

FIG. 8 is an different on-card routine that could be followed where the card would process data received as part of each transaction via box 80. The system would then provide a first low balance warning, either a light or a sound. This would be controlled by box 81 and could be as a result of a selective input by the user, such as a proper finger print on a selective button or the proper combination of buttons being pressed by the user. Box 82 would provide a second empty credit warning, again perhaps under selective control.

Figure 9:
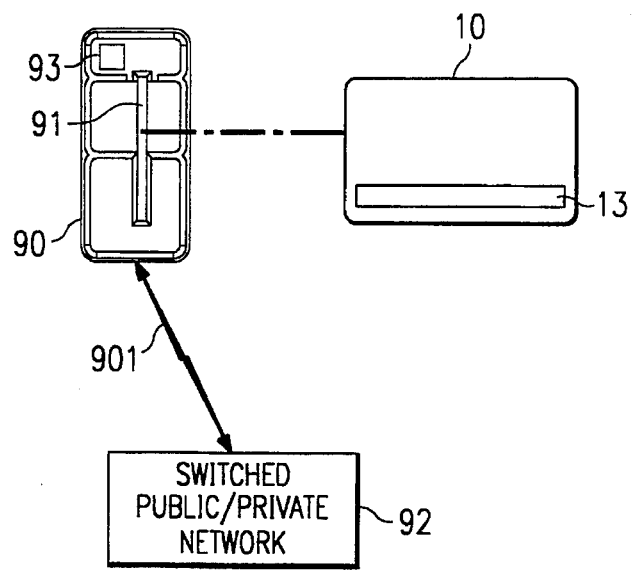
FIG. 9 shows use of the data stored on a card being used to control a telephone network.

FIG. 9 is an expansion of the system to use the data received on the card from center 14 for purposes other than merely credit information. Messages could be provided which could be read by visual display 42 (FIG. 4) or the data could be in the form of a telephone number which would be used to then control telephone calls via access device 91, communication terminal 90 and switched network 92 via communication link 901. Display 93 could be used to view the data stored on the card which could be telephone numbers or other information. People who travel anywhere in the world could receive telephone or other messages any time a credit purchase is made. In this manner two large networks, the credit/banking network and the telephone network could be linked together to provide enhanced mobility and convenience to people.

In one embodiment of the invention the card could be used for credit control of telephone transactions. The card would be "slipped" through slot 91 of telephone 90 and the account number read into the system as is currently done to control the point of sale transaction. The system could then store on the card the telephone number of waiting callers. These numbers could be selectively displayed on display 93, under control of either the user or the telephone system, or used to place additional calls to those stored numbers.

Public access readers (not shown) and processors could be provided at various locations so that card users can read the data stored on the card and, under control of the public terminal, manipulate that data as desired. The public devices could also access the credit card company data base for comparison or other purposes.

While the foregoing has concentrated on the embodiment showing a credit card application the same concept can be used for controlling a checking or savings account. This is particularly applicable for ATM type situations where a person withdraws (or deposits) funds from or into an account. The account is identified by data prestored on a banking (or credit) card and when the card is inserted in an ATM machine the account is identified. Often the user forgets to enter the transaction into his/her check book, resulting in a possible overdraft situation. Using this invention, the ATM debit (or credit) is automatically stored on the card, either by the central depository center (such as 14 in FIG. 1) or by the local ATM processor (such as 12 in FIG. 1). The user then need only process the stored data, as discussed above with respect to FIGS. 6–8, in conjunction with a locally controlled program, as discussed above with respect to FIG. 2.

Such a method can be expanded to include more data pertaining to the particular account, such as, for example, an itemization of all of the checking (including the amounts thereof) which have cleared the bank since the last time the card was used to access the account. In this manner, the user can at any time, by using his or her own set of operating instructions, as controlled by a processor remote from the central processing system, such as processor 20, determine an exact account balance and reconcile the account without the need for waiting for monthly statements from the bank. In some situations, this procedure can even eliminate the need for such monthly statements.

The bank could supply a software controlled routine to its account holders and the account holder can, simply by inserting the card into any ATM machine have the account information stored thereon. The account holder then would transfer the stored data from the card to the processor system on which the software program is running to determine his/her account balance as well as to obtain lists of all transactions.

Although the present invention and its advantages have been described in detail, it should be understood that various changes, substitutions and alterations can be made herein without departing from the spirit and scope of the invention as defined by the appended claims. For one example, while it is contemplated that the data to be stored on the card is transmitted by wire and entered on the card by physically inserting the card in a two-way data transfer device, the data could be directly received by the card from signals transmitted through the air or via some other media. Some memories are designed to accept such data directly and in other cases a signal detector, tuned to a specific frequency could be imbedded in the card. The card could be inserted in (or held against) a cellular telephone, or an airborne telephone (such as now found in many airplanes) for receipt of information.

What is claimed:

1. A method for use in controlling transactions pertaining to the permanent account of a user identified by a card assigned to said user by an issuer of the card where the user at the point of a card transaction usage has at least a portion of data previously stored on said card by the issuer of said card and pertaining to said permanent account sent to a central processor; said method comprising the steps of:

receiving at said card as part of each said card transaction usage, data unique to each said card transaction usage, said card usage data being itemized transaction data pertaining to a credit transaction, said itemized data including an identification of the individual transactions and the amounts thereof; and storing said received card transaction usage data on said card; and transferring said card usage data, including said individual transactions and the amounts thereof, from a card on which said data has been recorded to a data storage device remote from said card and comparing said transferred data with itemized transaction data obtained from the central processor on a transaction by transaction basis.

2. The method set forth in claim 1 wherein said central processing is located remote from said point of card usage and wherein said card usage data is received from a processing unit also located remote from said point of card usage.

3. The method set forth in claim 1 wherein said data storage device has associated within it a processor containing a program which manipulates financial data and wherein said transferring step further includes the step of:

merging said data removed from said card with data previously contained within said data storage device under control of said program.

4. The method set forth in claim 3 further comprising the step of displaying said stored card usage data under control of said user.

5. The method of tracking credit transactions for individual credit card users wherein each said credit card user from time to time uses a credit card at a merchant's place of business to pay for goods or services received and wherein said merchant, as part of the credit card payment transaction, itemizes each said purchase, said method comprising the steps of:

placing a credit card of a user in proximity to an electronic data transfer device;

transmitting information stored on said card and accessed therefrom by said transfer device to a data processing center;

transmitting to said data processing center information under control of said merchant and pertaining to said itemized purchases of said user, said information containing amounts to be debited from said user's account and containing an identification of the reason for each such debit;

storing on said user's card via said transfer device said information pertaining to said itemized transaction;

transferring credit card information pertaining to said user from said central processing center to a user controlled processing device; and comparing under control of said user controlled processing device said transferred data with said user's card stored data.

6. The method set forth in claim 5 further comprising the step of:

selectively transferring under said user's control said stored itemized transaction data from said card to said particular user controlled processing device.

7. The method set forth in claim 5 further comprising the step of:

storing on said card as part of said storing step data pertaining to the credit card balance available to said card.

8. The method set forth in claim 5 wherein said second transmitting step includes the step of:

transferring to said processing center data previously stored on said card pertaining to itemized transactions.

9. The method set forth in claim 5 further comprising the step of:

selectively displaying to said particular user certain combinations of data stored on said card.

10. The method set forth in claim 5 further comprising the step of:

displaying to said particular user under control of data contained in said card credit warning signals at preestablished levels.

11. The method of managing a credit card system in which credit cards are made available to individual users by a central processing source and wherein each user, by presenting the credit card assigned to that user to a vendor, can obtain items of value from that vendor who in turn uses information, including account numbers embedded in the credit card by the central processing source prior to delivery of the credit card to that user, for communicating to the central source the specific transactional details of each commercial transaction involving the credit card and wherein the central source credits the account of the vendor for the amount of each transaction and debits the account of the assigned user for each transactional item communicated from the vendor and wherein on a periodic basis the central processing source delivers a payment statement to the user, the payment statement itemizing in machine readable form the details of each transaction that has occurred with respect to all vendors within a defined period, the improvement comprising the steps of contemporaneously with certain vendor transactions storing on the credit card the specific transactional details of that transaction that are communicated to the central source;

machine comparing the stored specific transactional details from the credit card against the specific transactional details as contained on the periodic statement; and providing an indication to the user that a match has occurred as a result of the last-mentioned step.

12. The method set forth in claim 11 further including the step of:

removing from the credit card all stored transactional details that have been matched against the periodic statement.

* * * * *